(12) United States Patent
Collins et al.

(10) Patent No.: US 11,412,088 B1
(45) Date of Patent: Aug. 9, 2022

(54) METHODS, SYSTEMS, AND APPARATUS FOR CONNECTING INSURANCE CUSTOMERS WITH INDEPENDENT INSURANCE AGENTS

(71) Applicant: The Travelers Indemnity Company, Hartford, CT (US)

(72) Inventors: Dean M. Collins, Manchester, CT (US); Jason F. Polayes, Simsbury, CT (US)

(73) Assignee: The Travelers Indemnity Company, Hartford, CT (US)

( * ) Notice: Subject to any disclaimer, the term of this patent is extended or adjusted under 35 U.S.C. 154(b) by 1438 days.

(21) Appl. No.: 15/172,657

(22) Filed: Jun. 3, 2016

Related U.S. Application Data

(63) Continuation of application No. 11/389,928, filed on Mar. 27, 2006, now abandoned.

(51) Int. Cl.
*H04M 3/523* (2006.01)
*G06Q 30/02* (2012.01)
*G06Q 40/08* (2012.01)

(52) U.S. Cl.
CPC ...... *H04M 3/5235* (2013.01); *G06Q 30/0242* (2013.01); *G06Q 40/08* (2013.01); *H04M 3/5232* (2013.01)

(58) Field of Classification Search
CPC .................................................. G06Q 10/10
See application file for complete search history.

(56) References Cited

U.S. PATENT DOCUMENTS

| | | | | |
|---|---|---|---|---|
| 5,206,903 A | * | 4/1993 | Kohler | H04M 3/5233 379/214.01 |
| 5,742,675 A | * | 4/1998 | Kilander | H04M 3/523 379/265.04 |
| 5,920,621 A | * | 7/1999 | Gottlieb | H04M 3/5125 379/112.01 |
| 5,960,073 A | | 9/1999 | Kikinis et al. | |
| 6,333,980 B1 | * | 12/2001 | Hollatz | H04M 3/5233 379/265.12 |
| 6,678,266 B1 | | 1/2004 | Hollatz et al. | |
| 6,965,669 B2 | * | 11/2005 | Bickford | H04M 3/51 379/265.07 |
| 2002/0001300 A1 | | 1/2002 | Miloslavsky et al. | |
| 2003/0161463 A1 | * | 8/2003 | Galvin | H04M 3/51 379/265.01 |
| 2003/0191676 A1 | * | 10/2003 | Templeton | G06Q 10/0631 705/7.19 |

(Continued)

FOREIGN PATENT DOCUMENTS

| | | |
|---|---|---|
| EP | 1035718 | 9/2000 |
| EP | 1119170 | 7/2001 |

OTHER PUBLICATIONS

Office Action for U.S. Appl. No. 11/389,928 dated Jul. 22, 2009, 20 pp.
Final Office Action for U.S. Appl. No. 11/389,928 dated Mar. 1, 2010, 25 pp.

(Continued)

*Primary Examiner* — Antim G Shah
(74) *Attorney, Agent, or Firm* — RowanTree Law Group, PLLC; Carson C. K. Fincham

(57) ABSTRACT

Methods, systems, and software are disclosed for connecting insurance company customers contacting the insurance company to independent insurance agents.

20 Claims, 9 Drawing Sheets

(56) References Cited

U.S. PATENT DOCUMENTS

| | | | |
|---|---|---|---|
| 2003/0200122 A1* | 10/2003 | Nauert | G06Q 30/02 |
| | | | 705/4 |
| 2004/0062380 A1 | 4/2004 | Delaney | |
| 2004/0083125 A1 | 4/2004 | Almeida et al. | |
| 2005/0043986 A1* | 2/2005 | McConnell | H04M 3/5232 |
| | | | 379/265.02 |
| 2005/0063365 A1* | 3/2005 | Mathew | G06Q 10/10 |
| | | | 370/352 |
| 2005/0111653 A1* | 5/2005 | Joyce | H04M 3/523 |
| | | | 379/265.09 |
| 2005/0165930 A1* | 7/2005 | Whitman, Jr. | G06Q 10/06311 |
| | | | 709/226 |
| 2005/0177401 A1 | 8/2005 | Koeppel et al. | |
| 2005/0238157 A1* | 10/2005 | Shaffer | H04M 3/465 |
| | | | 379/211.01 |
| 2005/0286709 A1* | 12/2005 | Horton | G06Q 30/02 |
| | | | 379/265.09 |
| 2006/0212337 A1 | 9/2006 | Vayghan et al. | |

OTHER PUBLICATIONS

Office Action for U.S. Appl. No. 11/389,928 dated Jul. 9, 2010, 21 pp.
Final Office Action for U.S. Appl. No. 11/389,928 dated Mar. 30, 2011, 24 pp.
Examiner's Answer to Appeal Brief for U.S. Appl. No. 11/389,928 mailed Nov. 10, 2011, 30 pp.
Patent Board Decision for U.S. Appl. No. 11/389,928 mailed Jun. 11, 2015, 11 pp.
Webpage: Wikipedia, The Free Encyclopedia. "Zip Tone", dowloaded Mar. 15, 2022. https://en.wikipedia.org/wiki/Zip_tone. 2 pgs.

* cited by examiner

METHODS, SYSTEMS, AND APPARATUS FOR CONNECTING INSURANCE CUSTOMERS WITH INDEPENDENT INSURANCE AGENTS

CROSS-REFERENCE TO RELATED APPLICATIONS

The present application claims benefit and priority to, and is a Continuation of, U.S. patent application Ser. No. 11/389,928 filed on Mar. 27, 2006 and titled "METHODS, SYSTEMS, AND APPARATUS FOR CONNECTING INSURANCE CUSTOMERS WITH INDEPENDENT INSURANCE AGENTS", the entirety of which is hereby incorporated by reference herein.

BACKGROUND

Many insurance companies utilize independent insurance agents ("agents") to sell their products to consumers. The independent insurance agents are not employees of the insurance companies, but instead act as independent contractors. Unlike many industries that employ call centers to provide direct sales support or customer service, insurance companies have little or no control over the technology infrastructure of their agents. Insurance companies also lack access to the technology infrastructure the independent agents utilize, thereby preventing accurate tracking of agent performance. For example, insurance companies cannot track the number of calls an agent receives and compare that number to the agent's sales volume. In contrast, a company using a call center can monitor, record, and evaluate calls handled by call center employees to evaluate their performance and to provide training. Call centers can also correlate the results of each call to a specific outcome, such as a sale of a product.

An additional difficulty with utilizing independent agents is that insurance agents typically sell insurance products for several competing insurance companies. One method for an insurance company to improve sales is to provide incentives to agents to offer that company's policies more frequently than the policies of other insurance companies. Incentives can take the form of offering better products leading to more sales, higher commissions on sales, and reducing the effort necessary for the independent agent to make a sale, thus allowing the agent to make more sales with less effort. The lack of access to agents' infrastructure makes this last incentive harder to provide.

The independent agent relationship, however, provides significant benefits to insurance companies. For example, the insurance companies do not have to pay salaries or provide benefits to their sales force. In addition, the insurance companies can forgo the overhead of maintaining separate branch offices in each community in which they wish to offer insurance. Instead, these costs can be distributed among the various insurance companies that utilize the agents in the form of commissions on sales.

SUMMARY

A need exists in the art to provide insurance companies greater ability to involve themselves in the communications taking place between customers and independent insurance agents. Doing so can increase the insurance company's access to agent performance information. It can also make an agent's job easier. In one aspect, the invention relates to a method of selling insurance. The method includes an insurance company controlled communication device receiving a communication from an insurance customer. The method further includes determining whether an independent insurance agent is available for communicating with the customer, for example by receiving a human-initiated availability response. If the independent insurance agent is available, the method includes initiating a communication link between the customer and the independent insurance agent.

In one embodiment, the customer communication includes a voice communication received over the public switched telephone network ("PSTN"). In such embodiments, the insurance company initiates a voice communication between an insurance company-controlled communications device and the independent agent via the PSTN or a voice-over-IP ("VoIP") communication with the independent agent via a public or private packet switched network. The insurance company then links the voice communications together.

In another embodiment, the customer communication includes a VoIP communication received over a packet-switched network. In such embodiments, the insurance company initiates a voice communication between an insurance company-controlled communications device and the independent agent via the PSTN or a VoIP communication with the independent agent via a public or private packet switched network. The insurance company then links the voice communications together. If the communication link with the independent agent is over the PSTN, the method includes decoding the VoIP communication and forwarding the voice communication encoded therein over the PSTN.

In alternative embodiments, the customer communication includes a chat request, a web conference, an instant message, or other form of electronic communication.

The independent insurance agent to whom the customer is connected, in one embodiment, is selected from a plurality of independent insurance agents. The plurality of insurance agents may be contacted simultaneously or serially. The independent agent may be selected based on the order in which the contacted independent agents affirmatively indicate their availability to communicate with the customer. Alternatively, the independent agent may be selected based on other factors, including the past performance of the independent agent or a plan to provide fair distribution of customer communications among the plurality of independent agents. In still a further embodiment, the insurance agent is selected based on geographic proximity to the customer. Independent agents may inform the insurance company of their general availability by transmitting a request to be included in the plurality of independent agents from which the independent agent is selected. Independent agents may update their general availability by sending availability update messages to the insurance company.

In one embodiment, the method includes disseminating an advertisement for insurance products to the customer. The advertisement includes an identifier to include in the communication request from the customer to the insurance company. The insurance company can track the success of the advertisement based on statistics related to customer communications including the advertisement identifier.

In another embodiment, the method includes monitoring the communications between the customer and the independent agent. The communication may also be recorded. The insurance company may then provide feedback to the independent agent based on the monitored communication.

In other aspects, the invention relates to systems and software suitable for carrying at the methods described above. For example, the system includes at least one communication device for receiving a communication from a customer to form a first communication link, at least one communication device for initiating a communication with an independent agent to form a second communication link, and a call processing system for identifying available independent agents, receiving a human-initiated availability response, and for forming a third communication link connecting the first communication link with the second communication link.

BRIEF DESCRIPTION OF THE DRAWINGS

The system and methods may be better understood from the following illustrative description with reference to the following drawings in which.

DETAILED DESCRIPTION

To provide an overall understanding of the invention, certain illustrative embodiments will now be described, including systems, methods, and software for providing centralized communication infrastructure among a business, such as an insurance company, and independent entities, such as independent insurance agents ("agents"), providing services for the business. However, it will be understood by one of ordinary skill in the art that the systems, methods, and software described herein may be adapted and modified as is appropriate for the application being addressed and that the systems, methods, and software described herein may be employed in other suitable applications, and that such other additions and modifications will not depart from the scope hereof. In particular, while the following description relates specifically to insurance companies, their agents, and customers, it will be understood that the systems, methods, and software described herein can be employed in other industries that utilize independent agents in their sales channels.

Figure 1:
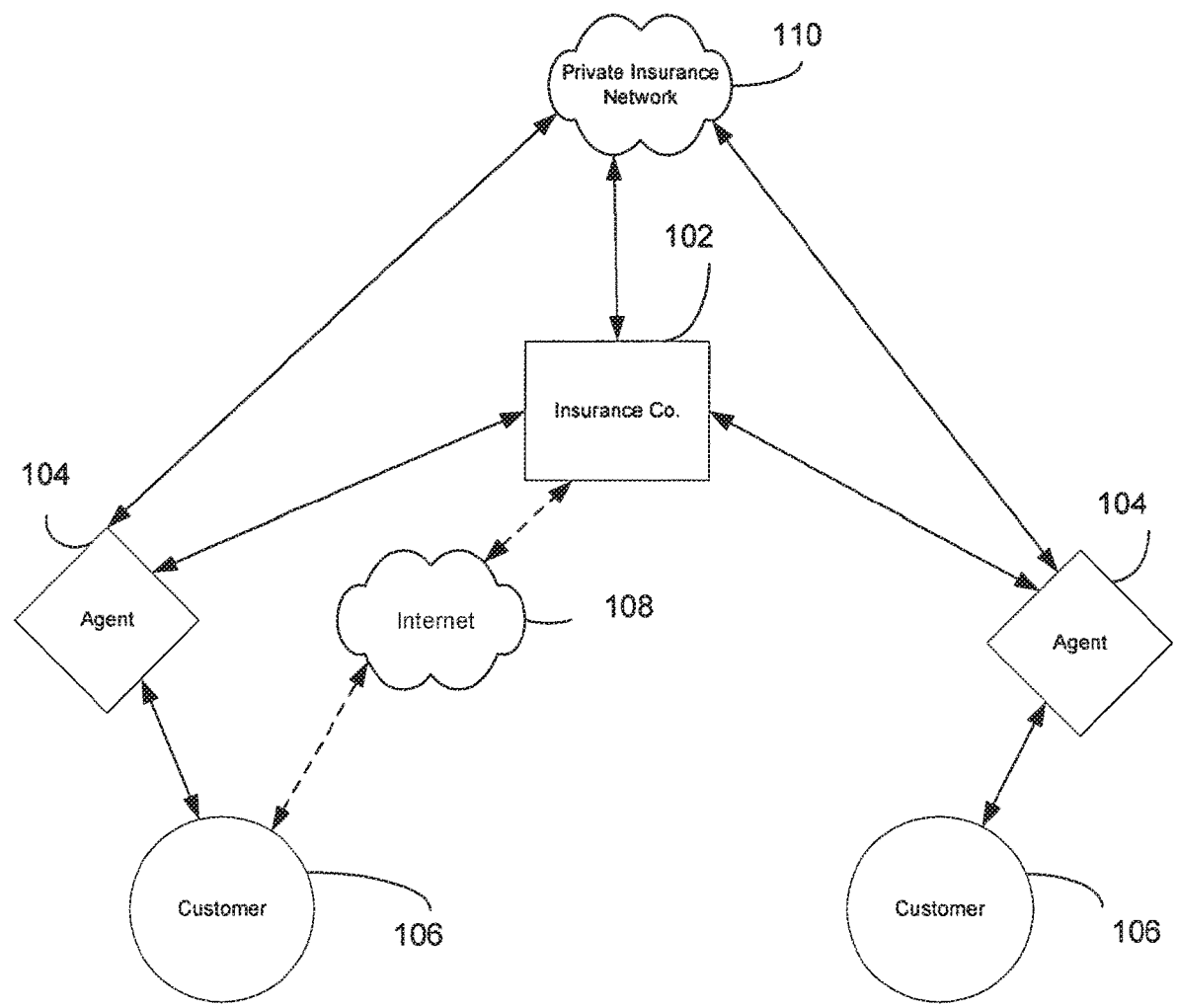
FIG. 1 is an insurance sales channel known in the prior art.

FIG. 1 is a diagram of a common sales channel 100 known and used in the art for the sale of insurance. As described above, a typical insurance company 102 works with independent insurance agents 104 ("agents") to sell its policies to customers 106. As used herein the term customer refers to party's already having an insurance policy with the insurance company, as well as party's investigating insurance coverage from the insurance company. An insurance company 102 works with one or more agents 104 in a community. The agents 104 serve as points of presence of the insurance company 102 for both sales and service. However, as described above, the agents 104 are not employed by the insurance company 102 and usually also sell insurance policies for other insurance companies.

The agents 104, being affiliated with multiple insurance companies, do not want company-specific technology infrastructure installed on their premises. If the agents 104 accepted such infrastructure, they would have to learn how to use each system for each company. They would also have to find the space for the additional equipment. As a result, a typical insurance agent 104 operates using a telephone and an Internet 108 connected computer. The agent may also have access to one or more private insurance related networks 110. Customers 106 locate agents 104 via personal referrals, advertisements, the telephone directory, or via the Internet 108. For example, many insurance companies 102 maintain web pages that allow customers 106 to search for agents 104 in their community. Customers 106 then directly contact the agents 104 for sales assistance via telephone, as opposed to contacting the insurance company. While the insurance company 102 can track how many times their web page was searched for agent 104 contact information, the insurance company 102 cannot track how many potential customers 106 actually contacted a particular insurance agent 104 or whether a customer 106 bought an insurance policy from the identified agent 104, unless and until the agent 104 seeks underwriting approval or issues the customer 106 a policy.

Figure 2:
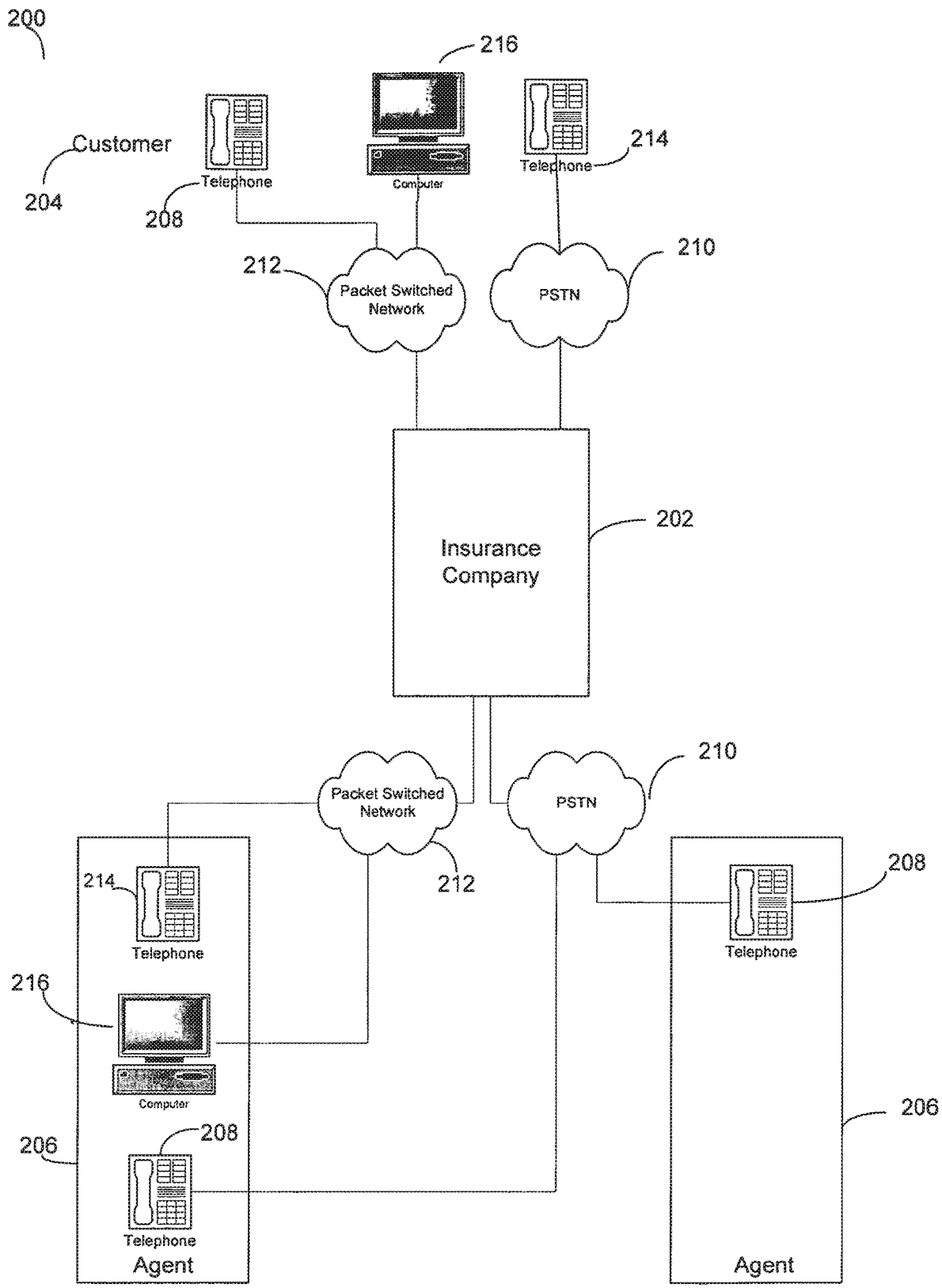
FIG. 2 is an insurance sales channel according to an illustrative embodiment of the invention.
Figure 3:
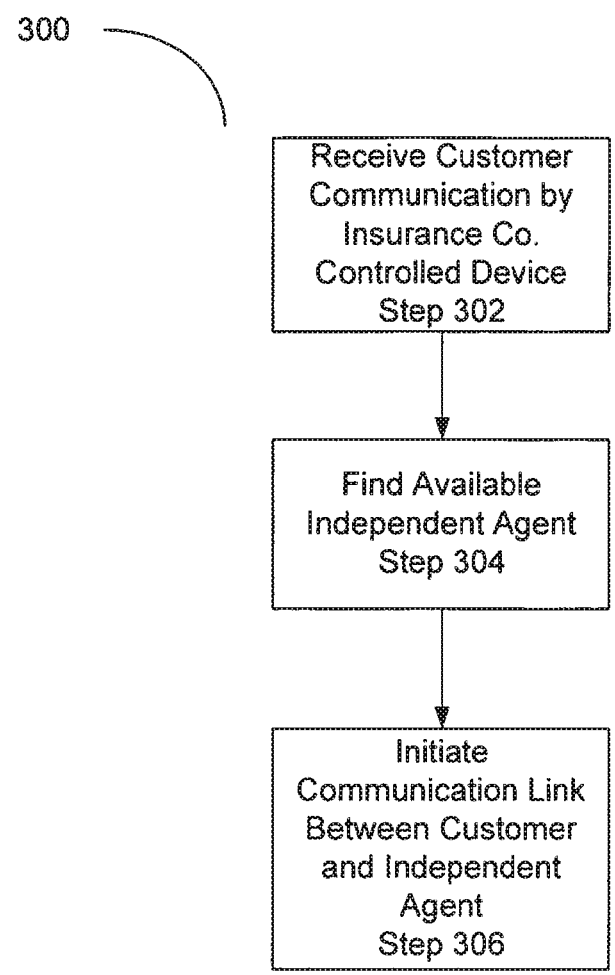
FIG. 3 is a flow chart of a method of connecting insurance customers with independent insurance agents, according to an illustrative embodiment of the invention.

FIG. 2 is a diagram of an insurance sales channel 200 according to an illustrative embodiment of the invention. FIG. 3 is a flow chart of a method of connecting insurance customers with agents suitable for use in the illustrative insurance sales channel 200. Referring to FIGS. 2 and 3, the sales channel 200 places the insurance company 202 as an intermediary between the customer 204 and the independent agents 206. Instead of, or in addition to, customers 204 contacting independent agents 206 directly, customers 204 first contact the insurance company 202 (step 302). The insurance company 202 identifies an agent 206 to whom to connect the customer 204 (step 304). For example, as will be described further below, the agent 206 may be identified based on availability, available communications technology, prior agent performance, or particular customer needs. The insurance company 202 then initiates a communication link between the customer 204 and the identified agent 206 (step 306). The customer 204 may contact the insurance company 202 using a telephone 208 over a public switch telephone network ("PSTN") 210, or via a packet switched network 212, for example by voice-over-internet-protocol ("VoIP") telephone 214, Internet chat, instant message, web conference, or other multimedia communication means. Agents 206 may choose to implement whatever communications technology they desire. For example, one agent 206 may decide to only use a PSTN telephone 208. Another agent 206 may utilize a PSTN telephone 208, as well as packet switched communication technologies such as a VoIP telephone 214, or computer 216 based communications technologies, such as Internet chat, instant messaging, web conferencing, etc.

Figure 4:
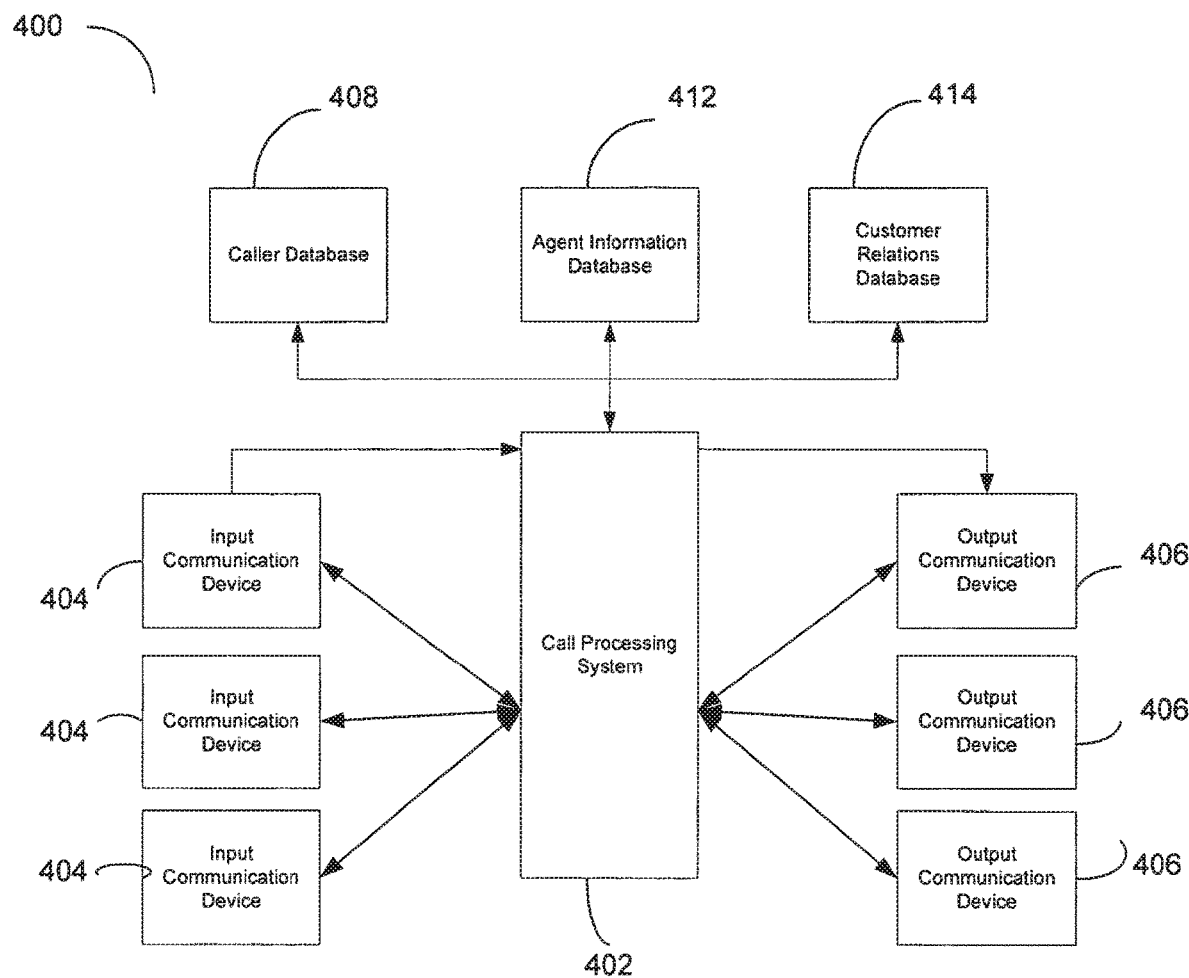
FIG. 4 is a block diagram of a technology infrastructure for implementing the insurance sales channel of FIG. 2, according to an illustrative embodiment of the invention.

FIG. 4 is a block diagram of the technology infrastructure 400 (the "infrastructure 400") utilized by the insurance company 402 in the insurance sales channel 200, according to an illustrative embodiment of the invention. Referring to FIGS. 2 and 4, the infrastructure 400 includes a call processing system 402, one or more incoming communication devices 404, and one or more outgoing communication devices 406. The infrastructure 400 also includes a caller database 408, a customer relations database 410 ("CRDB"), and an agent information database 412, in each communication with the call processing system 402. The call processing system 402 preferably utilizes the SERATEL™ system, provided by Transera Communications, Inc., located in Cupertino, Calif. The call processing system 402 interfaces with at least one incoming communications device 406 equipped for handling communications received via the PSTN. For example, the incoming communications device 406 may include a computer equipped with a telephony board, such as the TRI OOO provided by Brooktrout, Inc., located in Needham, Mass. Similar telephony boards are provided by Intel Corporation, headquartered in Santa Clara, Calif. The telephony board includes call handling, call switching, and caller interface functionalities for prompting callers for information and for receiving responses to the prompts, for example, via voice recognition or touch tone processing. The caller interface functionalities are controlled by the call processing system 402.

The call processing system 402 also interfaces with at least one incoming communications device 406 equipped for handling communications received via the packet switched network. The incoming communications device 406 may include a telephony board for handling digital voice communications and/or one or more servers for handling non-voice communications, such Internet chat communications. In one embodiment, a single incoming communication device 404 handles communications arriving from both the PSTN and over a packet switched network.

The call processing system 402 interfaces with outgoing communication devices 408 for initiating communications with agents 206. As with the incoming communications devices 406, the infrastructure 400 may include a single outgoing communications device 408 or a separate outgoing communications devices 408 for outgoing PSTN and packet-switched communications. In one implementation, a single computer handles both incoming and outgoing communications. The call processing system 402 may include one or more additional communications devices, such as servers or routers. The various communications devices included in the call processing system 402 and the rest of the infrastructure 400 may be housed at the insurance company 202 or at one or more third-party locations.

The call processing system 402 stores data in the caller database 408, the CRDB 410, and the agent information database 412 in relation to the communications that it receives. The insurance company 402 can then utilize the stored information for, among other things, evaluating the success of an advertising campaign (see FIG. 7), evaluate agent 206 performance, or provide feedback to agents 206 (see FIG. 8). The caller database 408 stores information related to received customer communications, whether the received communications were telephone calls, or other modes of communication. The CRDB 410 stores data about customers 204. For example, the CRDB 410 may store contact information for customers 204, communication preferences (e.g., language preference), policy information, claims history, communication history, and previously contacted agent 206 information. The agent information database 412 includes information about the independent agents 206 the insurance company 202 works with. The agent information database 412 includes, for example, agent contact information, agent location, agent performance metrics (e.g., percent of sales calls closed or customer satisfaction), products offered, language skills, and the agents' general availability. The agent information database 412 preferably stores general availability of agents 206, as opposed to their actual availability, e.g., whether an agent 206 currently has a line free. Actual availability can be determined as needed by the call processing system 402.

Agents 206 can modify their general availability status by contacting the insurance company 202. For example, in the beginning of the business day, an agent 206 can contact the insurance company 202 via telephone, Internet web page, or by other communications means to inform the insurance company 202 that the agent 206 is available for receiving communications. Similarly, when the agent 206 takes a lunch break or leaves for the day, the agent 206 can update his availability with the insurance company 202. The call processing system 402 executes machine executable code to handle incoming communications, initiate outgoing communications, and to utilize information stored in the caller database 408, the CRDB 410, and the agent information database 412 to determine the appropriate agent 206 with whom to connect a customer 204. The machine executable code can programmed in a high-level programming language such as C, C++, JAVA or other programming language known in the art. The code executes on one or more computing devices, such as servers, routers, or other computer devices. In alternative implementations, various sets of instructions executed by the call processing system 402 are hardwired into the call processing system 402 in application specific integrated circuits, digital signal processors, programmable ROM devices, or other integrated circuits. Together, the machine executable code and the hardwired instructions interoperate to carry out the methods described in FIG. 3 and FIGS. 5-8, described below.

Figure 5:
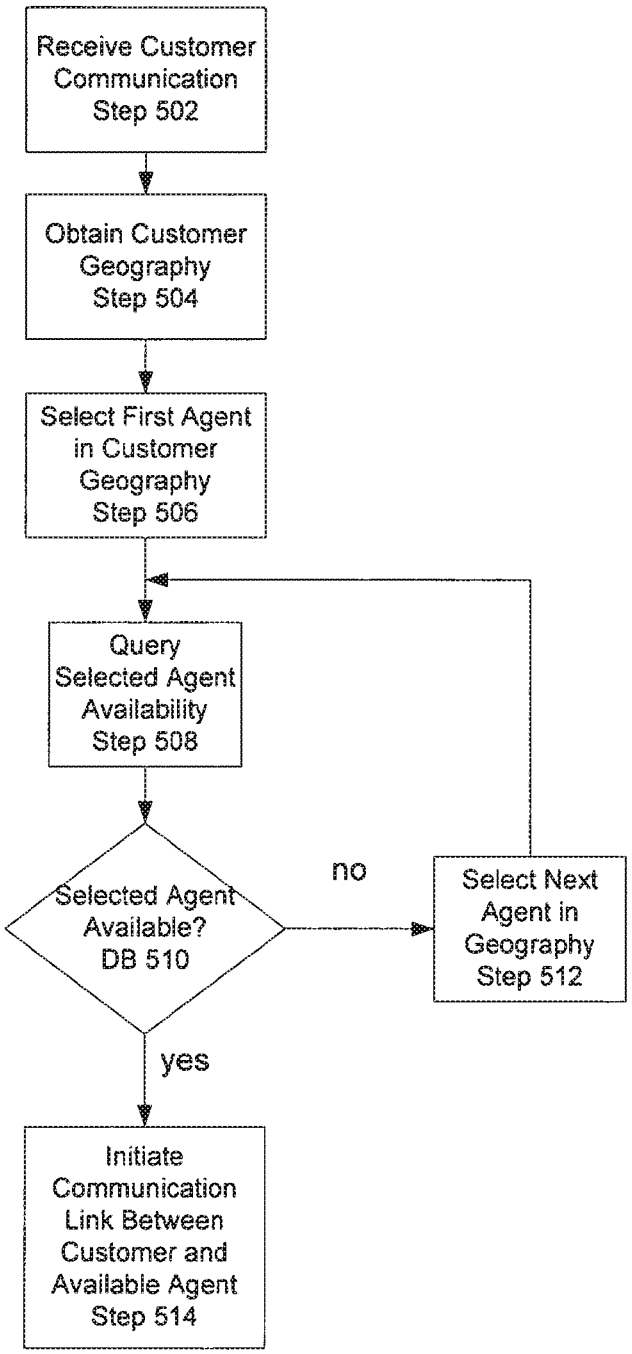
FIG. 5 is a flow chart of a more detailed method of connecting customers to independent insurance agents, according to an illustrative embodiment of the invention.

FIG. 5 is a flow chart of a more detailed method of connecting insurance customers 204 to agents 206, according to an illustrative embodiment of the invention. Referring to FIGS. 2, 4, and 5, the method 500 begins with the insurance company 202 receiving a communication from a customer 204 at an incoming communication device 406 (step 502). The call processing system 402 then obtains data corresponding to geographic location of the customer 204 (step 504). In one implementation, if caller ID information is available for an incoming telephone call, the call processing system 402 queries the caller database 408 and/or the CRDB 410 to determine if any geographic data is stored in relation to the phone number from which the communication was initiated. Alternatively, the call processing system 402 may maintain a table of telephone area codes and corresponding geographies to compare to caller ID information. In still an alternative implementation, the call processing system 402 prompts the customer 204 to provide his or her zip code, telephone number, address or other datum related to the geographic location of the customer 204. Any information obtained about the caller may then be stored in the caller database 408.

If a telephone number is obtained from the caller or determined based on caller ID, Automatic Number Identification ("ANI"), or Dialed Number Identification System, or similar information ("DNIS"), the call processing system 402 can query the CRDB 410 to determine if the caller likely already has a relationship with one of the agents 206. For callers with pre-existing agent relationship noted in the CRDB 410, the call processing system 402 can identify that agent 206 and connect the caller directly to that agent 206, bypassing the remainder of this process.

Based on the geographic location of the customer 204, the call processing system 402 selects an agent 206 with whom the call processing system 402 attempts to put the customer 204 in contact (step 506). The call processing system 402 makes a selection based on information stored in the agent information database 412 and the customer 204 location data obtained at step 504. The agent 206 can be selected on a number of criteria. For example, the agent 206 can be selected based on, without limitation, his or her prior performance in converting calls into sales, customer 204 feedback, internal insurance company 202 evaluation of agent 206 performance based on monitored communications with customers 204, geographic proximity to the customer 204, customer 204 language preference, product experience, available communication technology, and a distribution plan (e.g., round-robin) for distributing incoming communications among agents 206 in a geography.

After the call processing system 402 selects an agent 206, the call processing system 402 determines the current availability of the selected agent 206 (step 508). If the communication with the agent 206 is to over the PSTN, the call processing system 402 instructs an outgoing communication device 408 to initiate a telephone call to the selected agent 206. The call processing system 402 monitors the call to the agent 206 to detect if the agent 206 is available for handling the customer 204 call. If the agent 206 does not answer the telephone within a predetermined amount of time, the call processing system 402 considers the agent 206 unavailable. If the phone line of the agent 206 picks up, the call processing system 402 provides a prompt for the agent 206 to verify his availability, for example, by requesting the answering party to "press 1" if they are available to receive a call. If an answering machine picks up the phone line, the answering machine will not be able to respond to the availability prompt, resulting in the call processing system 402 considering the agent 206 unavailable. If the agent 206 has access to VoIP technology, the call processing system 402 can obtain additional state information typically available in VoIP systems. If the communication is to be in the form of an Internet chat, instant messages, a multimedia conference, or the like, the call processing system 402 queries the availability of the agent 206 by sending an instant message to the agent 206, causing a pop-up to appear on the computer screen of the agent 206, or by other similar means. The agent 206 can then respond to the message if he or she is available.

At decision block 510, the call processing system 402 determines whether the selected agent 206 was available based on the response to the availability query. If the agent 206 is unavailable, the call processing system 402 selects a different agent 206 (step 512) and queries the availability of the newly selected agent 206 (step 508). Once a selected agent 206 is determined to be available, the call processing system 402 initiates a communication link between the customer 204 and the available agent 206 via the call processing system 402 (step 514). Subsequent communications between the customer 204 and the available agent 206 continue to pass through the infrastructure 400 even after the communication link is formed, thereby allowing the insurance company 202 to monitor the communications and the results of the communications. Salient information from the communications are stored in the agent information database 412 and the CRDB 410 as appropriate.

Figure 6:
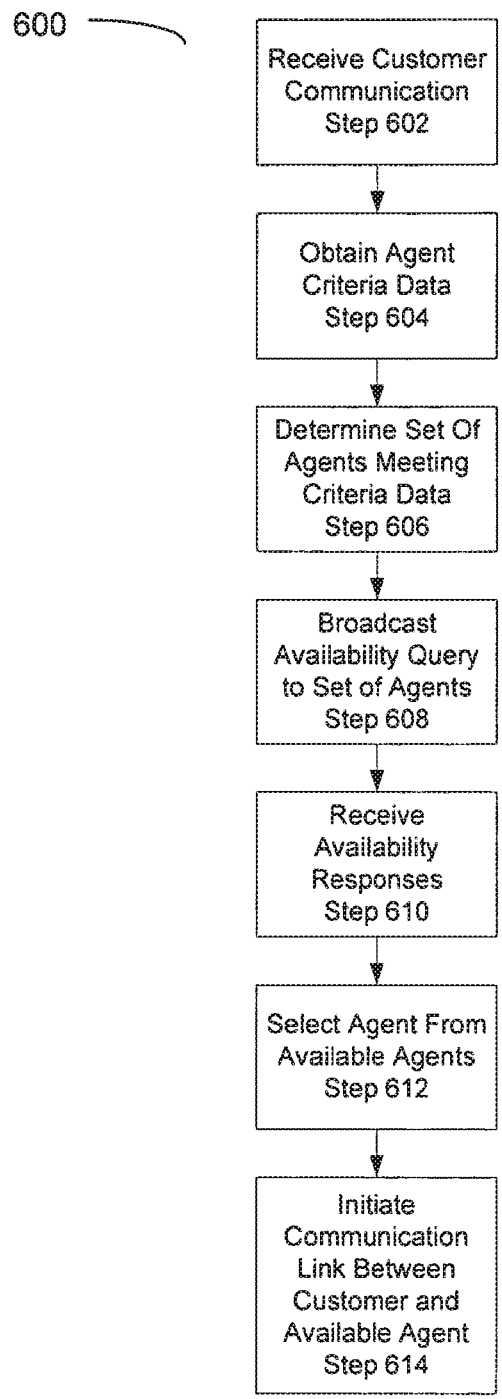
FIG. 6 is a flow chart of a second method of connecting customers to independent insurance agents, according to an illustrative embodiment of the invention.

FIG. 6 is a flowchart of an alternative method 600 for connecting a customer 204 with an agent 206. Referring to FIGS. 2, 4, and 6, the method 600 begins with the insurance company 202 receiving a communication from a customer 204 (step 602) at an incoming communication device 406. The call processing system 402 of the infrastructure 400 then causes the incoming communication device 406 to obtain data corresponding to the particular agent selection criteria the infrastructure 400 is utilizing to identify agents 206 to put the customer 204 in touch with (step 604). The data may include, without limitation, the geographic location of the customer 204 (e.g., in the form of city, state, zip code, or area code, etc.), the preferred language of the customer 204, and the type of insurance (e.g., auto insurance, life insurance, business insurance, etc.) for which the customer is looking. Based on the obtained data and information stored in the agent information database 412, the call processing system 402 selects a set of agents 206 that meet the criteria (step 606).

The call processing system 402 then broadcasts an availability query to each of the agents 206 in the set of agents 206 (step 608). For example, in one embodiment, the call processing system 402 causes the outgoing communications devices 408 to initiate, substantially at the same time, communications with each of the agents 206 in the selected set of agents 206. For example, if the selected set of agents 206 includes four agents 206, the call processing system 402 causes four outgoing communication devices 406 (or a fewer number if the outgoing communications devices 406 can handle multiple communications simultaneously) to attempt to initiate communication with each of the agents 206. The call processing system 402 then waits to receive availability responses from the agents 206 (step 608). Based on the responses to the availability queries, the call processing system 402 selects one of the agents 206 to whom to connect the customer 204 (step 610). In one implementation, the call processing system 402 selects the first agent 206 that responds that he or she is indeed available. In an alternative implementation, the call processing system 402 selects the agent 206 responding in the affirmative with the best historical performance record according to the agent information database 412. In another implementation, the call processing system 402 chooses the available agent 206 that is next agent 206 in an agent distribution plan set to evenly distribute calls among agents 206. After an agent 206 is selected (step 610), the call processing system 402 links the incoming communication with the communication initiated between one of the outgoing communication devices 408 and the selected agent 206 (step 612).

Figure 7:
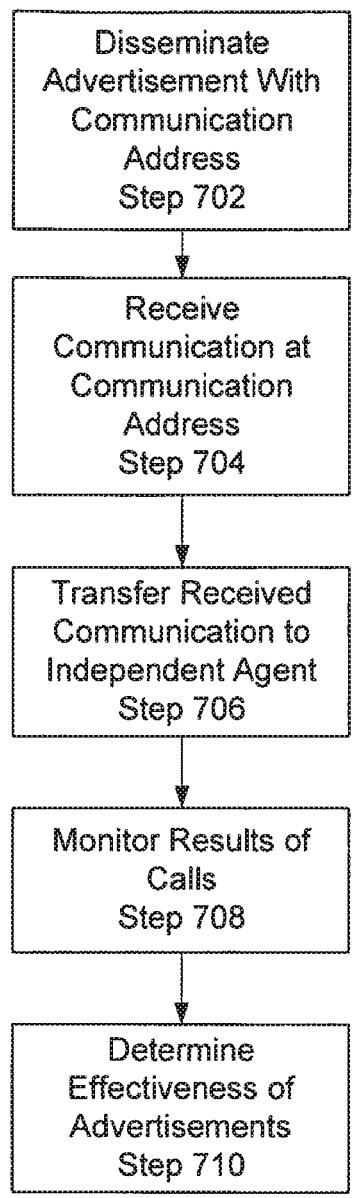
FIG. 7 is a flow chart of a method of evaluating an insurance advertisement, according to an illustrative embodiment of the invention.

FIG. 7 is a flow chart of a method 700 of tracking insurance advertisement effectiveness according to an illustrative embodiment of the invention. The method 700 begins with the dissemination of an advertisement for an insurance product (step 702). The advertisement can be disseminated in the newspaper, on television, over the radio, via email, via an Internet browser pop-up window, or as a web banner on a web page, or via any other advertisement means known in the art. Preferably, the advertisement includes an advertisement specific identifier for linking communications resulting from the advertisement to the receipt of the advertisement. For example, in one implementation, the advertisement may include a communication address, such as a phone number, extension number, or a URL, dedicated to receiving communications related to the advertisement. Alternatively, the advertisement may include a code which a customer 204 can, for example, enter using a telephone keypad upon prompting by the insurance company 202 during a call. The identifier is stored in the caller database 408 and or the CRDB 410 in relation to the communication. The insurance company 202 then receives a communication at the address listed in the advertisement or a communication in which a customer 204 enters the code provided in the advertisement (step 704). The call processing system 402 of the insurance company 202 then transfers the incoming communication to an independent agent 206 using, for example, the methods 600 or 700 (step 706). The insurance company 202 monitors the call and tracks the eventual outcome of the communication (step 708). For example, the insurance company 202 determines whether the communication resulted in a sale of a policy. Even if the call does not immediately result in a sale, later sales can be traced back to the initial communication by comparing new sales information with data in the caller database 408 and the CRDB 410.

Based on statistics generated by monitoring the communications, the insurance company 202 can measure the effectiveness of the advertisements it purchases (step 710). In the simplest case, the insurance company 202 can track the communication volume to determine if a particular advertisement resulted in an increased number of sales inquiries. Similarly, the insurance company 202 can correlate policy issuances arising from communications inspired by the advertisement to normal policy issuance rates or to policy issuance rates related to other advertisements.

Figure 8:
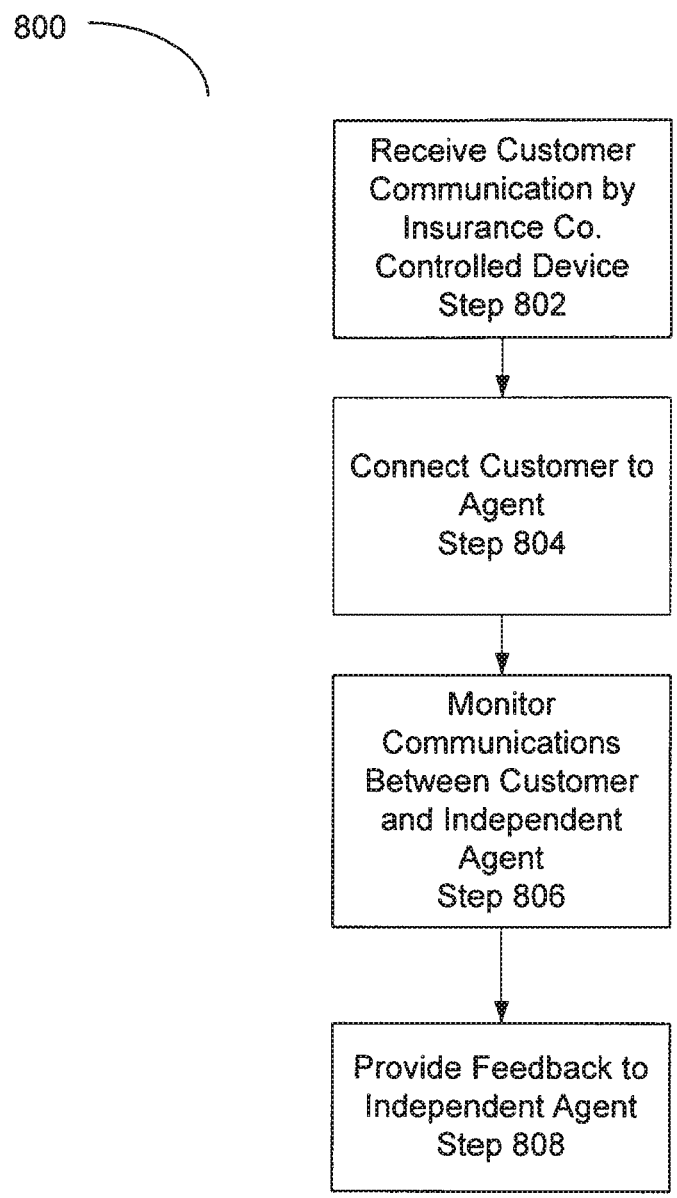
FIG. 8 is a flow chart of a method of evaluating non-employees, according to an illustrative embodiment of the invention.

FIG. 8 is a flowchart of method 800 for providing feedback to non-employees who handle communications for an entity. As mentioned above, insurance companies 202 typically lack access to the actual communications between independent agents 206 and customers 204. Thus, unlike companies using standard call centers, insurance companies cannot provide feedback to the agents 206 based on review of their customer 204 interactions. The illustrative insurance sales channel remedies this problem by allowing the insurance company 202 to record and monitor the communications it receives and connects to agents 206.

Figure 9:
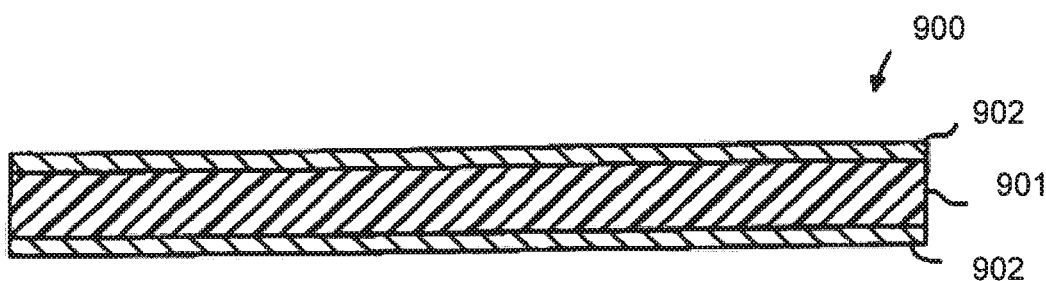
FIG. 9 is a cross-sectional view of a magnetic data storage medium encoded with a set of machine-executable instructions for performing a method for connecting insurance customers with independent insurance agents, an according to an illustrative embodiment of the invention.

Referring to FIGS. 2, 4, and 8, the method 800 begins with the insurance company 202 receiving a customer 204 communication at an insurance company 202 controlled communications device (step 802). Using one of the methods 500 or 600 described above, the customer 204 is connected to an independent insurance agent 206 (step 804). The insurance company 202 monitors and optionally records the subsequent communication between the customer 204 and the agent 206 (step 806). The insurance company 202 reviews the communication and provides feedback to the agent 206 based on the review (step 808). FIG. 9 shows a cross section of a magnetic data storage medium 900 which can be encoded with a machine-executable program that can be carried out by a system such as call processing system 402 of FIG. 4. Medium 900 can be a conventional floppy diskette or hard disk, having a suitable substrate 901, which may be conventional, and a suitable coating 902, which may be conventional, on one or both sides, containing magnetic domains (not visible) whose polarity or orientation can be altered magnetically to encode the machine executable program. Medium 900 may also have an opening (not shown) for receiving the spindle of a disk drive or other data storage device.

Figure 10:
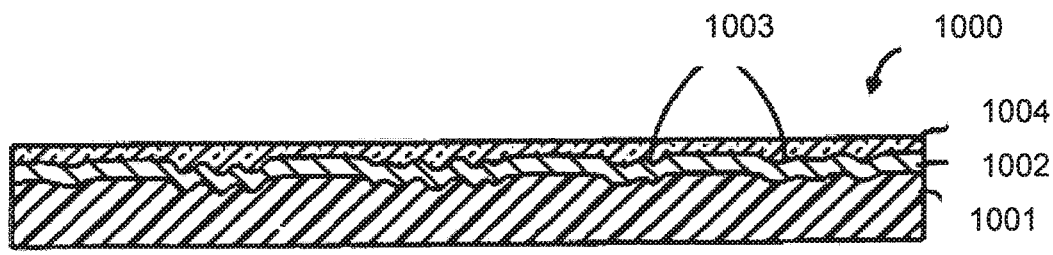
FIG. 10 is a cross-sectional view of an optically readable data storage medium encoded with a set of machine-executable instructions for performing a method for connecting insurance customers with independent insurance agents, an according to an illustrative embodiment of the invention.

FIG. 10 shows a cross section of an optically-readable data storage medium 1000 which also can be encoded with such a machine-executable program, which can be carried out by a system such as call processing system 402 of FIG. 4. Medium 1000 can be a conventional compact disk read only memory ("CD-ROM") or a rewritable medium such as a magneto-optical disk which is optically readable and magneto-optically writable. Medium 1000 preferably has a suitable substrate 1001, which may be conventional, and a suitable coating 1002, which may be conventional, usually on one side of substrate 1001. In the case of a CD-ROM, as is well known, coating 1002 is reflective and is impressed with a plurality of pits 1003 to encode the machine-executable program. The arrangement of pits is read by reflecting laser light off the surface of coating 1002. A protective coating 1004, which preferably is substantially transparent, is provided on top of coating 1002.

In the case of a magneto-optical disk, as is well known, coating 1002 has no pits 1003, but has a plurality of magnetic domains whose polarity or orientation can be changed magnetically when heated above a certain temperature, as by a laser (not shown). The orientation of the domains can be read by measuring the polarization of laser light reflected from coating 1002. The arrangement of the domains encodes the program as described above.

The invention may be embodied in other specific forms without departing form the spirit or essential characteristics thereof. The forgoing embodiments are therefore to be considered in all respects illustrative, rather than limiting of the invention.

What is claimed is:

1. A centralized call processing system for routing, to independent customer service agents, incoming calls made to a telephone number and for tracking advertising performance, comprising:

at least one electronic processing device;

at least one telephony communications board in communication with the at least one electronic processing device, the at least one telephony communications board providing caller interface functionalities for prompting callers for information; and a non-transitory data storage device storing instructions that when executed by the at least one electronic processing device result in:

receiving, by the at least one telephony communications board, an incoming call from a caller;

obtaining, by the at least one telephony communications board and from the caller, independent agent selection criteria data, wherein the independent agent selection criteria data comprises a type of technology required to answer the call and an advertisement code descriptive of a particular advertisement;

querying, utilizing the independent agent selection criteria data, a database storing agent information;

identifying, by the at least one electronic processing device and based on the querying of the database storing agent information utilizing the independent agent selection criteria data, one agent from a plurality of independent agents to which the call from the caller is to be routed, wherein the identifying of the one agent from the plurality of independent agents to which the call from the caller is to be routed, comprises:

determining, based on a result of the querying utilizing the independent agent selection criteria data of the database storing agent information, that the type of technology required to answer the call matches the type of technology utilized by the one agent from the plurality of independent agents and that the advertisement code matches a code stored with respect to the one agent from the plurality of independent agents;

determining, by the at least one telephony communications board, that the one agent from the plurality of independent agents is currently available to receive the call from the caller;

initiating, in response to the determining that the one agent from the plurality of independent agents is currently available to receive the call from the caller, a communication link between the one agent from the plurality of independent agents and the caller; and storing, in a database and by the at least one electronic processing device, data descriptive of a communication session between the caller and the one agent from the plurality of independent agents.

2. The system of claim 1, wherein the receiving comprises receiving a signal from a PSTN, and wherein the communication link comprises a link between a caller device connected to the PSTN and an agent device connected to a packet-switched network.

3. The system of claim 1, wherein the receiving comprises receiving a signal from a PSTN, and wherein the communication link comprises a link between a caller device connected to the PSTN and an agent device connected to the PSTN.

4. The system of claim 1, wherein the receiving comprises receiving a signal from a packet-switched network, and wherein the communication link comprises a link between a caller device connected to the packet-switched network and an agent device connected to the packet-switched network.

5. The system of claim 1, wherein the receiving comprises receiving a signal from a packet-switched network, and wherein the communication link comprises a link between a caller device connected to the packet-switched network and an agent device connected to a PSTN.

6. The system of claim 1, wherein the obtaining of the independent agent selection criteria data comprises prompting the caller, via the caller interface functionalities of the at least one telephony communications board, for the advertisement code.

7. The system of claim 1, wherein the determining that the one agent from the plurality of independent agents is currently available to receive the call from the caller, comprises:

querying a database storing general availability information for the plurality of independent agents; and determining that a current time of the call falls within time data defined by the general availability information stored with respect to the one agent from the plurality of independent agents.

8. The system of claim 1, wherein the instructions, when executed by the at least one electronic processing device, further result in:

determining, by the at least one electronic processing device, whether the communication session between the caller and the one agent from the plurality of independent agents results in a sale;

storing, in an advertisement tracking database and by the at least one electronic processing device and in relation to the advertising code, an indication descriptive of whether the communication session between the caller and the one agent from the plurality of independent agents results in a sale; and computing, by the at least one electronic processing device and based on stored indication and other stored data descriptive of whether other calls associated with the advertising code have resulted in sales, a statistical effectiveness measure of the particular advertisement.

9. The system of claim 1, wherein the determining that the one agent from the plurality of independent agents is currently available to receive the call from the caller, comprises:

querying, by the at least one telephony communications board, a packet-switched network state associated with the one agent from the plurality of independent agents.

10. The system of claim 1, wherein the determining that the one agent from the plurality of independent agents is currently available to receive the call from the caller, comprises:

causing, by the at least one electronic processing device, a current availability prompt pop-up window to appear on a display screen of a computer utilized by the one agent from the plurality of independent agents, the current availability prompt pop-up window prompting the one agent from the plurality of independent agents to verify current availability by providing input via the current availability prompt pop-up window; and receiving, by the at least one electronic processing device, the input provided by the one agent from the plurality of independent agents.

11. A method for centralized call processing for routing, to independent customer service agents, incoming calls made to a telephone number and for tracking advertising performance, comprising:

receiving, by at least one telephony communications board in communication with at least one electronic processing device, wherein the at least one telephony communications board provides caller interface functionalities for prompting callers for information, an incoming call from a caller;

obtaining, by the at least one telephony communications board and from the caller, independent agent selection criteria data, wherein the independent agent selection criteria data comprises a type of technology required to answer the call and an advertisement code descriptive of a particular advertisement;

querying, by the at least one electronic processing device and utilizing the independent agent selection criteria data, a database storing agent information;

identifying, by the at least one electronic processing device and based on the querying of the database storing agent information utilizing the independent agent selection criteria data, one agent from a plurality of independent agents to which the call from the caller is to be routed, wherein the identifying of the one agent from the plurality of independent agents to which the call from the caller is to be routed, comprises:

determining, based on a result of the querying utilizing the independent agent selection criteria data of the database storing agent information, that the type of technology required to answer the call matches the type of technology utilized by the one agent from the plurality of independent agents and that the advertisement code matches a code stored with respect to the one agent from the plurality of independent agents;

determining, by the at least one telephony communications board, that the one agent from the plurality of independent agents is currently available to receive the call from the caller;

initiating, in response to the determining that the one agent from the plurality of independent agents is currently available to receive the call from the caller, a communication link between the one agent from the plurality of independent agents and the caller; and storing, in a non-transitory data storage device and by the at least one electronic processing device, data descriptive of a communication session between the caller and the one agent from the plurality of independent agents.

12. The method of claim 11, wherein the receiving comprises receiving a signal from a PSTN, and wherein the communication link comprises a link between a caller device connected to the PSTN and an agent device connected to a packet-switched network.

13. The method of claim 11, wherein the receiving comprises receiving a signal from a PSTN, and wherein the communication link comprises a link between a caller device connected to the PSTN and an agent device connected to the PSTN.

14. The method of claim 11, wherein the receiving comprises receiving a signal from a packet-switched network, and wherein the communication link comprises a link between a caller device connected to the packet-switched network and an agent device connected to the packet-switched network.

15. The method of claim 11, wherein the receiving comprises receiving a signal from a packet-switched network, and wherein the communication link comprises a link between a caller device connected to the packet-switched network and an agent device connected to a PSTN.

16. The method of claim 11, wherein the obtaining of the independent agent selection criteria data comprises prompting the caller, via the caller interface functionalities of the at least one telephony communications board, for the advertisement code.

17. The method of claim 11, wherein the determining that the one agent from the plurality of independent agents is currently available to receive the call from the caller, comprises:
  querying a database storing general availability information for the plurality of independent agents; and
  determining that a current time of the call falls within time data defined by the general availability information stored with respect to the one agent from the plurality of independent agents.

18. The method of claim 11, further comprising:
  determining, by the at least one electronic processing device, whether the communication session between the caller and the one agent from the plurality of independent agents results in a sale;
  storing, in an advertisement tracking database and by the at least one electronic processing device and in relation to the advertising code, an indication descriptive of whether the communication session between the caller and the one agent from the plurality of independent agents results in a sale; and
    computing, by the at least one electronic processing device and based on stored indication and other stored data descriptive of whether other calls associated with the advertising code have resulted in sales, a statistical effectiveness measure of the particular advertisement.

19. The method of claim 11, wherein the determining that the one agent from the plurality of independent agents is currently available to receive the call from the caller, comprises:
  querying, by the at least one telephony communications board, a packet-switched network state associated with the one agent from the plurality of independent agents.

20. The method of claim 11, wherein the determining that the one agent from the plurality of independent agents is currently available to receive the call from the caller, comprises:
  causing, by the at least one electronic processing device, a current availability prompt pop-up window to appear on a display screen of a computer utilized by the one agent from the plurality of independent agents, the current availability prompt pop-up window prompting the one agent from the plurality of independent agents to verify current availability by providing input via the current availability prompt pop-up window; and
  receiving, by the at least one electronic processing device, the input provided by the one agent from the plurality of independent agents.

\* \* \* \* \*